United States Patent
Bliss et al.

(10) Patent No.: US 7,983,890 B2
(45) Date of Patent: Jul. 19, 2011

(54) METHOD AND APPARATUS PERFORMING AUTOMATIC MAPPING FOR A MULTI-PROCESSOR SYSTEM

(75) Inventors: Nadya Travinin Bliss, Cambridge, MA (US); Henry Hoffman, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 519 days.

(21) Appl. No.: 12/139,802

(22) Filed: Jun. 16, 2008

(65) Prior Publication Data

US 2009/0006072 A1    Jan. 1, 2009

Related U.S. Application Data

(60) Provisional application No. 60/944,602, filed on Jun. 18, 2007.

(51) Int. Cl.
*G06F 9/445*    (2006.01)
(52) U.S. Cl. .............. 703/15; 703/22; 703/24; 711/158; 717/137

(58) Field of Classification Search .................... 703/15, 703/22, 24; 717/137; 711/158; 716/4, 5
See application file for complete search history.

(56) References Cited

U.S. PATENT DOCUMENTS

| | | | |
|---|---|---|---|
| 6,425,060 B1 * | 7/2002 | Mounes-Toussi et al. .... | 711/158 |
| 6,996,517 B1 * | 2/2006 | Papaefstathiou ............... | 703/22 |
| 7,700,140 B2 * | 4/2010 | Moen et al. ..................... | 426/53 |
| 2007/0156380 A1 * | 7/2007 | Dalton ............................ | 703/15 |

* cited by examiner

*Primary Examiner* — Thai Phan
(74) *Attorney, Agent, or Firm* — Chapin IP Law, LLC (57) ABSTRACT

A method, apparatus and computer program product for mapping and executing an application on a multi-processor system is presented. At least one array to be considered for distribution among processors of said multi-processor system is indicated. The application is mapped according to a performance model associated with benchmark performance data of a parallel library on a parallel computer architecture. Then either the application is executed on the multi-processor system, or the application is simulated using a specified machine model for a multiprocessor system. Feedback information is then provided to influence architecture parameters for a multiprocessor system.

20 Claims, 12 Drawing Sheets

```
%Initialize variables
1. M=...; N=...;
%Create distributed arrays
2. A=rand(M, N);
3. B=zeros(M, N);
4. C=zeros(M, N);
%2-D FFT
5. B(:,:)=fft(A,[],1); %FFT along columns
6. C(:,:)=fft(B,[],2); %FFT along rows
%Print out C
7. C
```

(A)

```
%Initialize variables
1. M=...; N=...;
%Create distributed arrays
2. A=rand(M, N, t);
3. B=zeros(M, N, t);
4. C=zeros(M, N, t);
%2-D FFT
5. B(:,:)=fft(A,[],1); %FFT along columns
6. C(:,:)=fft(B,[],2); %FFT along rows
%Print out C
7. C
```

METHOD AND APPARATUS PERFORMING AUTOMATIC MAPPING FOR A MULTI-PROCESSOR SYSTEM

CROSS REFERENCE TO RELATED APPLICATIONS

The present application claims the benefit of U.S. Provisional Patent Application No. 60/944,602 filed on Jun. 18, 2007, which is incorporated herein by reference in its entirety.

GOVERNMENT GRANT

This invention was made with government support under grant number F19628-00-C-0002 awarded by the Air Force. The government has certain right in this invention.

BACKGROUND

The demand for computational power continues to grow in the scientific computing and embedded systems communities. As a result, multiprocessor systems are becoming more and more common. Multiprocessing is the use of two or more central processing units (CPUs) within a single computer system. The term also refers to the ability of a system to support more than one processor and/or the ability to allocate tasks between them. There are many variations on this basic theme, and the definition of multiprocessing can vary with context, mostly as a function of how CPUs are defined (multiple cores on one die, multiple chips in one package, multiple packages in one system unit, etc.).

In a multiprocessing system, all CPUs may be equal, or some may be reserved for special purposes. A combination of hardware and operating system software design considerations determine the symmetry (or lack thereof) in a given system. For example, hardware or software considerations may require that only one CPU respond to all hardware interrupts, whereas all other work in the system may be distributed equally among CPUs; or execution of kernel-mode code may be restricted to only one processor (either a specific processor, or only one processor at a time), whereas user-mode code may be executed in any combination of processors. Multiprocessing systems are often easier to design if such restrictions are imposed, but they tend to be less efficient than systems in which all CPUs are utilized equally.

Systems that treat all CPUs equally are called symmetric multiprocessing (SMP) systems. In systems where all CPUs are not equal, system resources may be divided in a number of ways, including asymmetric multiprocessing (ASMP), non-uniform memory access (NUMA) multiprocessing, and clustered multiprocessing.

While these parallel systems address the need for increased throughput, they also introduce additional levels of programming complexity. Moreover, the advent of multicore multiprocessors adds yet another level of parallelism and complexity. These trends underscore the need for new tools and techniques for parallel programming.

The need for parallel processing is evident in both scientific and real-time computing. The need to process large quantities of data at high speeds is making parallel programming important at all levels of programming expertise. The requirement to parallelize programs can reduce productivity and prolong development.

SUMMARY

Parallel programming suffers from large number of complexities/deficiencies. One such deficiency is that the general problem of decomposing and efficiently mapping parallel programs remains unsolved. In fact, although research has been ongoing for over forty years, parallelizing compilers have in general fallen short of expectations, so that most parallel programmers must explicitly parallelize and map their algorithms themselves.

Determining how to program a parallel processor efficiently can be a difficult task. The programmer is required to understand several details abut the parallel computer architecture and various parallel algorithms. In particular, decomposing or mapping data structures and tasks in a serial program into parallel parts is challenging. Additionally, writing parallel code that runs correctly and efficiently requires synchronization and coordination among the various processors. The program must be written such that it takes into account a careful balancing of a program's communication and computation parts. When dealing with a single processor architecture, the programmer attempts to minimize the number of operations the processor performs.

When the same program is migrated from a serial processor architecture to a multi-processor architecture, simply minimizing the number of computations does not necessarily guarantee optimal performance. Any speedup associated with a parallelizable part of a program is highly dependent on interprocessor communication.

Embodiments of the invention significantly overcome such deficiencies and provide mechanisms and techniques that provide an automatic mapping technology referred to herein as pMapper.

The pMapper automatic mapping architecture is designed to tackle the global optimization problem of mapping signal and image processing applications onto parallel computers. In its current state, pMapper is written as a library that automatically distributes MATLAB® programs on a cluster, however the concepts are applicable to other languages and systems as well. Additionally, pMapper can be used to aid in code design, processor studies, and system specifications.

In a particular embodiment of a method of mapping and executing an application on a multi-processor system, the method includes indicating at least one array to be considered for distribution among processors of the multi-processor system. The method further includes collecting benchmark performance data of a parallel library on a parallel computer architecture and storing the benchmark performance data as a performance model. Additionally the method includes mapping the application according to the performance model and performing at least one of the group consisting of executing the application on the multi-processor system and simulating the application using a specified machine model for a multi-processor system. The method also includes providing feedback information to influence architecture parameters for a multiprocessor system.

Other embodiments include a computer readable medium having computer readable code thereon for mapping and executing an application on a multi-processor system. The computer readable medium includes instructions for indicating at least one array to be considered for distribution among processors of the multi-processor system. The computer readable medium further includes instructions for collecting benchmark performance data of a parallel library on a parallel computer architecture and instructions for storing the benchmark performance data as a performance model. Additionally the computer readable medium includes instructions for mapping the application according to the performance model and instructions for performing at least one of the group consisting of executing the application on the multi-processor system and simulating the application using a specified machine model for a multiprocessor system. The computer readable medium also includes instructions for providing feedback information to influence architecture parameters for multiprocessor system.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides mapping and executing an application on a multi-processor system as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mapping and executing an application on a multi-processor system as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The pMapper automatic mapping architecture is designed to tackle the global optimization issue of mapping signal and image processing applications onto parallel computers. In its current state, pMapper is written as a library that automatically distributes MATLAB® programs on a cluster, however the concepts are applicable to other languages and systems. Additionally, pMapper can be used to aid in code design, processor studies, and system specifications.

In order to determine where pMapper fits into the current research, a taxonomy of mapping approaches is represented in Table 1.

TABLE 1

| Taxonomy of automatic mapping approaches. | | |
| --- | --- | --- |
| Concurrency | Serial | Parallel |
| Support layer | Compiler | Middleware |
| Code analysis | Static | Dynamic |
| Optimization window | Local/ Peephole | Global/ Program Flow |

Concurrency could be either serial or parallel. Serial concurrency implies that the automatic mapper is mapping into the serial memory hierarchy of the system. On the other hand, parallel concurrency implies that the mapper is searching for the best mapping onto a distributed architecture.

Support layer defines in which software layer the automatic mapper is implemented. The automatic mapper could be implemented in the compiler layer or in middleware layer.

Code analysis specifies whether static or dynamic code analysis is performed. Static code analysis implies looking at code as text, while dynamic code analysis considers the behavior of the code at runtime.

The last category, optimization window, specifies whether the automated performance tuning is performed on a single function (locally) or the entire program flow (globally).

pMapper can be classified as having parallel concurrency, written at middleware layer, performing dynamic code analysis and global optimization. One key advantage of the pMapper framework over other existing approaches is that pMapper performs both dynamic code analysis and global (program flow) optimization, while maintaining the simplicity of the interface.

pMapper is a system for automatic mapping of signal and image processing applications to multi-processor systems without an increase in the level of programming complexity for the application developer. pMapper is a powerful and flexible system and allows mapping of both scientific computing applications to clusters and real-time applications to embedded systems. Additionally, pMapper can aid processor studies and processor selection for specific types of applications.

Figure 1:
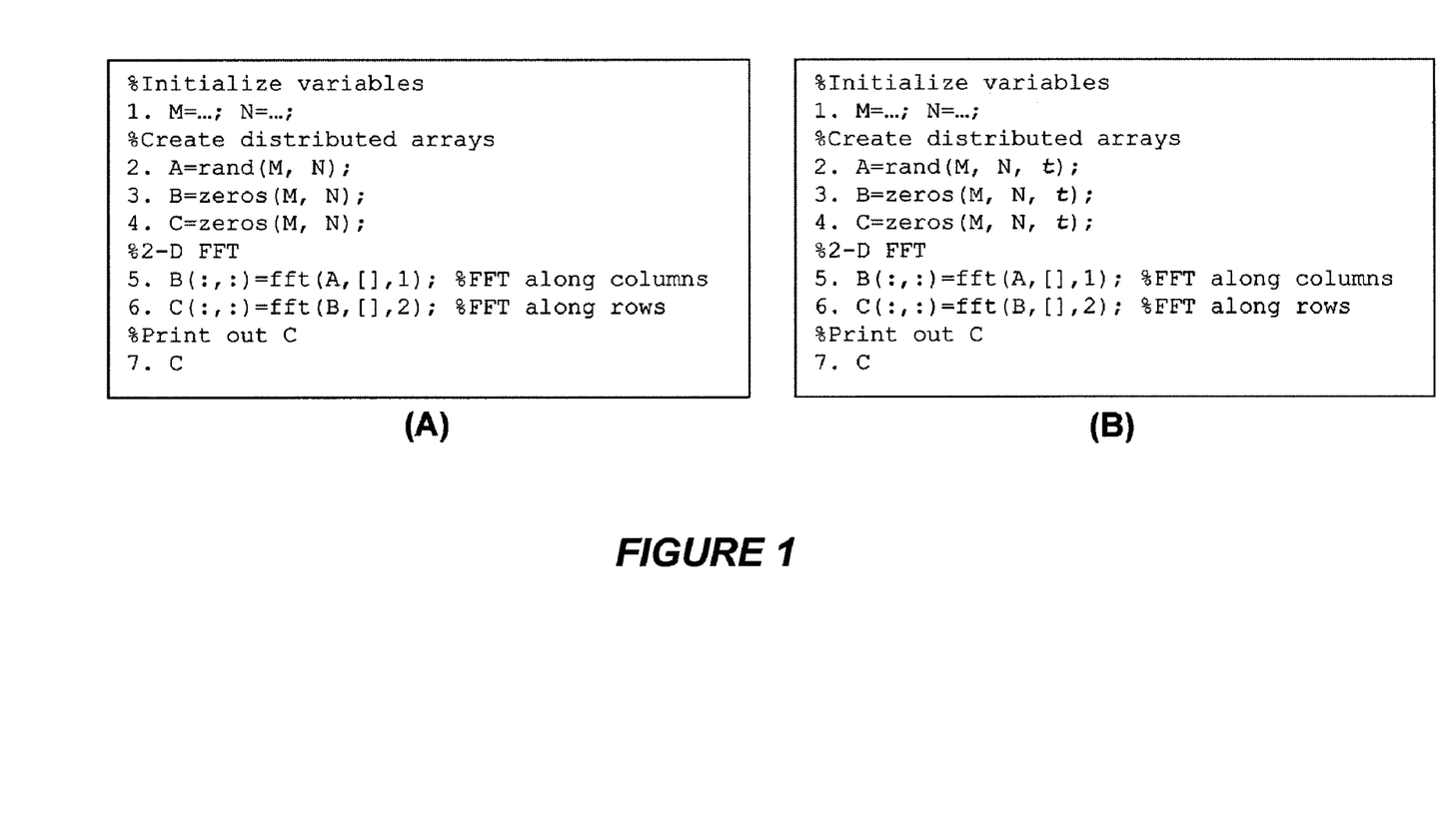
FIGS. 1A and 1B depict code segments showing arrays tagged with parallel tags as indicated in FIG. 1B, and the regular code in FIG. 1A.

The current research implementation of pMapper is in MATLAB and is written as a layer on top of the pMatlab parallel MATLAB library. The user indicates to the system which numerical arrays should be considered for distribution by tagging those arrays with parallel tags as indicated in FIG. 1B. Note that the changes to the regular code (equivalent MATLAB code in FIG. 1A) are minor.

Figure 2:
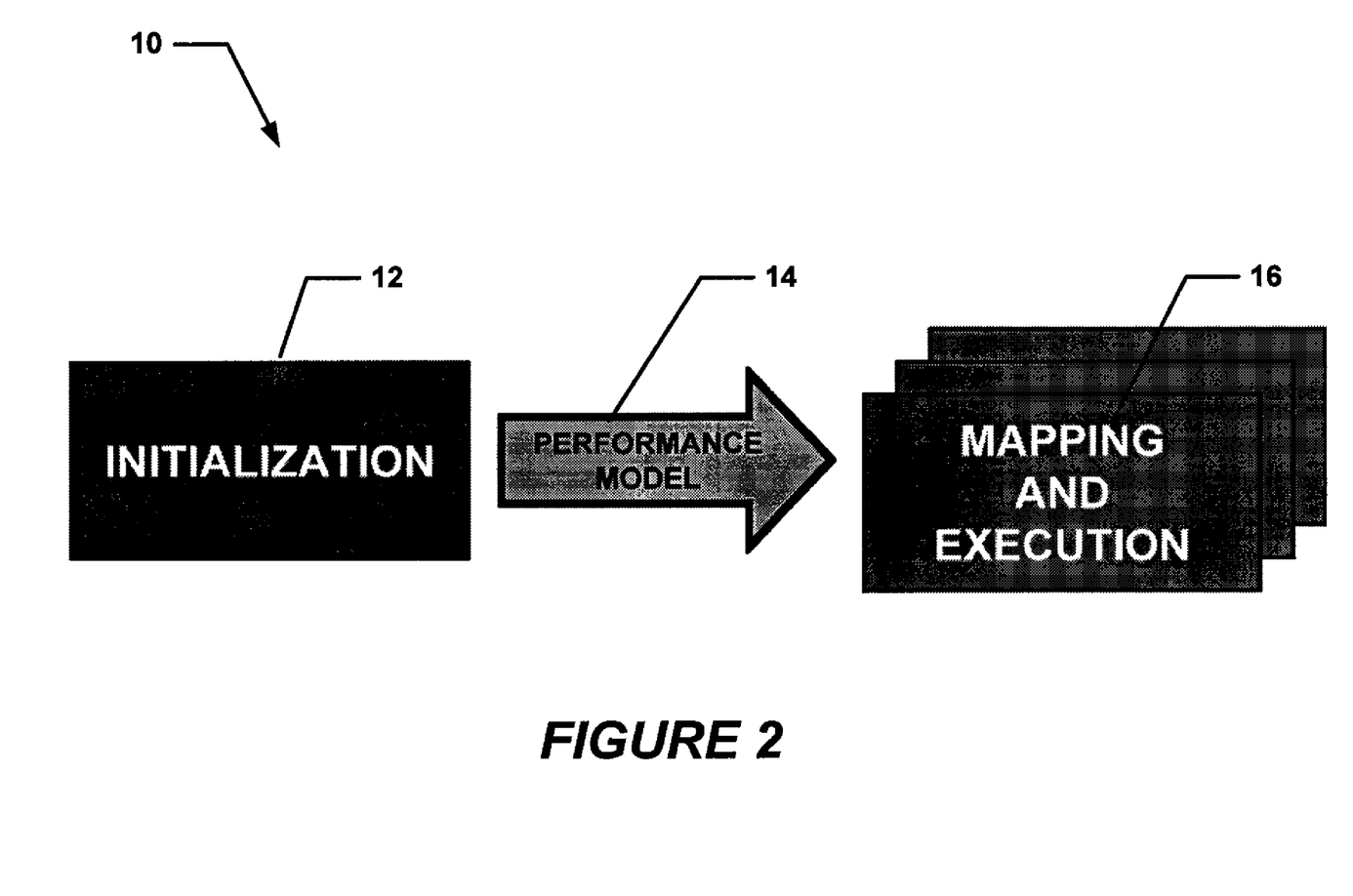
FIG. 2 depicts a block diagram of two-phase mapping architecture.

In order to provide accurate mappings, it is necessary to collect benchmark performance data of the parallel library on the target parallel architecture. The task of benchmarking the library is computationally intensive. Once the benchmarking data is collected, it can be used to generate maps in an efficient manner. This yields a two-phase mapping architecture 10 as shown in FIG. 2. A first phase is an initialization phase 12 and a second phase is a mapping and execution phase 16.

The initialization phase 12 is performed once when pMapper is installed on the target architecture. Once the timing data are collected and stored as a performance model 14, they are used to generate maps for the tagged numerical arrays. The mapping and execution phase 16 is performed once for each program at runtime.

The two-phase design is consistent with the design goal of fast time to solution. Since the majority of the work is done once during initialization, i.e. constructing the performance model, the mapping phase itself takes a relatively short amount of time.

Figure 3:
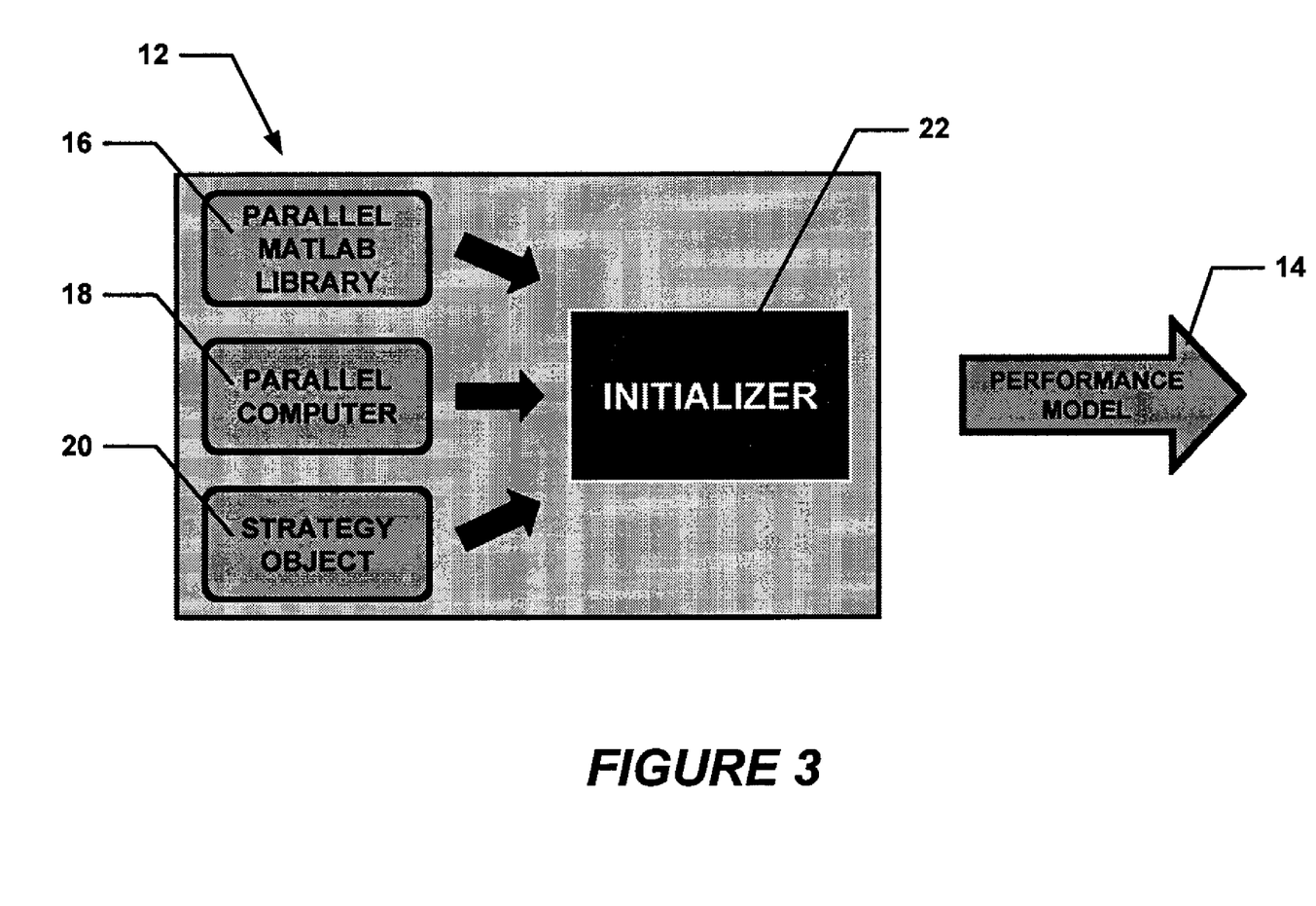
FIG. 3 depicts a block diagram of an initialization phase.

FIG. 3 is a diagram of the initialization phase 12. The initialization phase 12 utilizes three inputs: a parallel library 16, a parallel computer 18, and a strategy object 20. The parallel library 16 is the underlying computational library that is used to execute the parallel code. In this example implementation, the parallel library 16 is the latest version of the pMatlab library. The initializer 22 runs timing experiments specific to the system and library version in order to construct the performance model 14. The strategy object 20 contains general mapping heuristics provided by an expert parallel programmer. The purpose of the strategy object 20 is to eliminate large sections of the map search space and simplify the job of the expert mapping system. The pMapper system is completely functional without the strategy object 20.

The output of the initialization phase 12 is the performance model 14. The initializer 22 times the parallel library functions on the parallel computer 18. The functions are timed for different sizes and input/output maps. In a particular implementation, the performance model 14 is a database with timing information for each parallel function.

Figure 4:
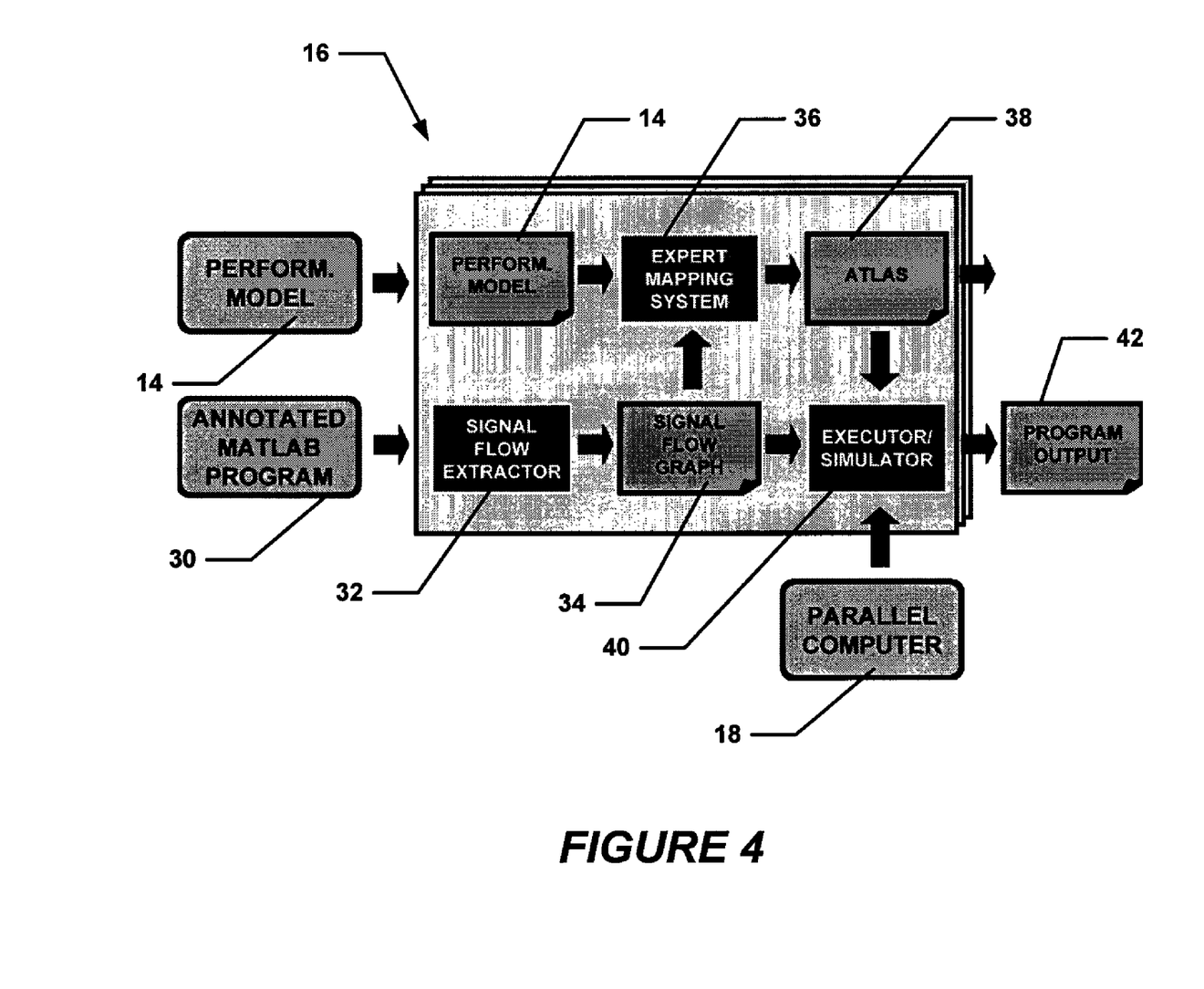
FIG. 4 depicts a block diagram of a mapping and execution phase.

FIG. 4 presents a block diagram of the mapping and execution phase 16. pMapper collects as much information as possible about the program structure prior to assigning maps to distributed arrays. Another key design concept is runtime evaluation, which allows the mapping algorithm to have access to array sizes and other runtime information at runtime.

Figure 5:
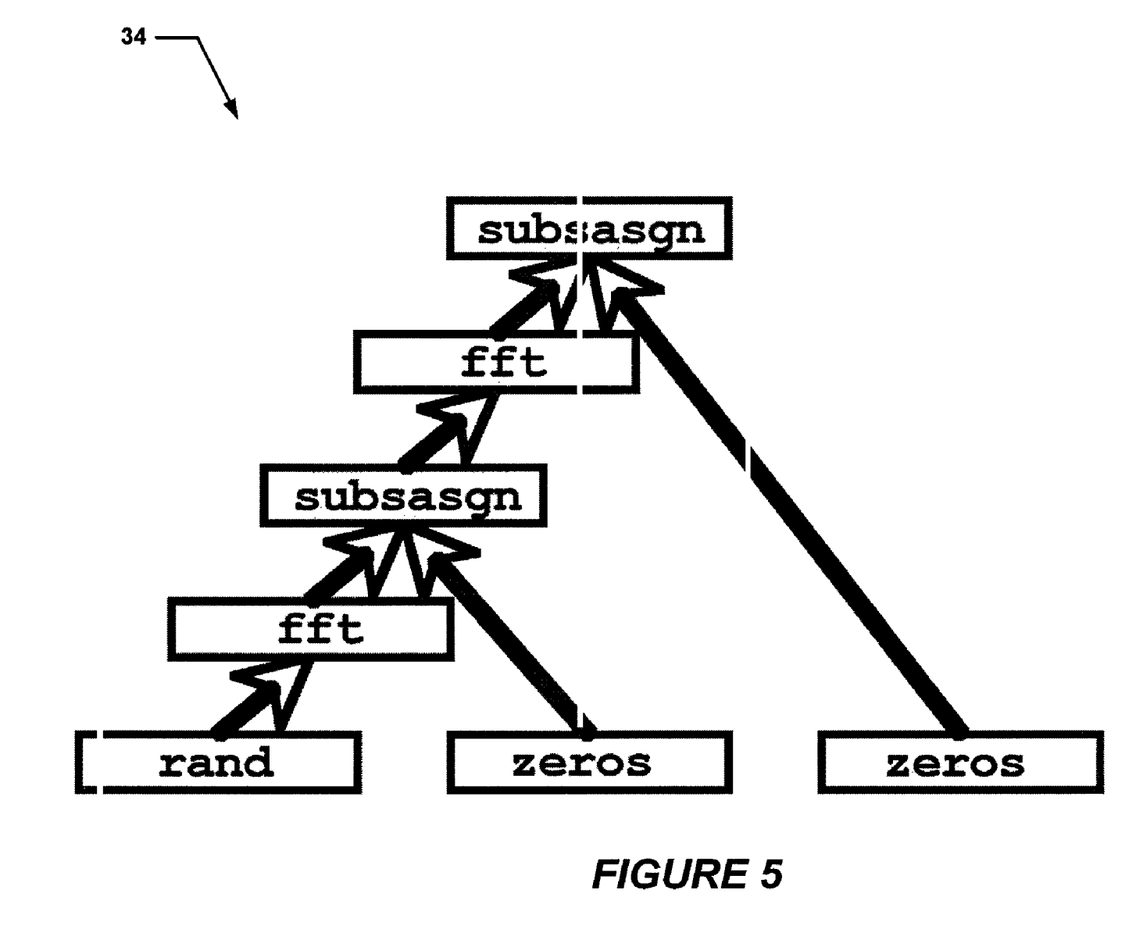
FIG. 5 depicts a block diagram of a signal flow graph.

In the code example in FIG. 1B, lines 2 to 4, the output of an array constructor (rand( ), zeros( ), etc.) produces a data object that stores necessary information about the array. No memory is allocated for the data of the numerical arrays at construction time. Similarly, when the fft( ) function call is made, no FFT is performed. Instead, tagged variables, along with functions that operate on them, are inserted into a signal flow graph 34 (or a dependency graph), an example of which is shown in FIG. 5.

At this point in the program the variables and function calls exist in pMapper controlled space. The transfer of control from pMapper to the programming language environment (in this case, the environment is MATLAB) occurs when the program requires access to the data. An example of such an operation is the display operation, or simply the omission of the semicolon in MATLAB syntax, as illustrated on line 7 in FIG. 1B. pMapper maps the program to the parallel architecture and executes the code only when a data access operation takes place.

Once the data access operation occurs, the signal flow extractor 32 extracts the relevant signal flow graph (SFG) 34 from the entire program signal flow graph. This is accomplished by tracing back from the last write to the variable requiring evaluation and including nodes through node dependencies. Note that only the nodes necessary for the evaluation of the invoking node are extracted.

Once the SFG 34 is extracted, it is passed to the Expert Mapping System (EMS) 36 along with the performance model 14 from the initialization phase 12. In order to satisfy the fast time-to-solution requirement of the mapping system, the EMS 36 is preferably not computationally intensive.

The EMS 36, or the mapper, generates an atlas 38 for the signal flow graph 34. An atlas 38 is a collection of maps, with each map corresponding to one of the numerical arrays tagged for distribution by the user. The atlas 38, together with the relevant signal flow graph 34, is then submitted to the executor/simulator 40. The executor/simulator 40 combines the atlas 38 and the signal flow graph 34 to produce parallel code and then executes the code on the underlying parallel computer 18 and returns the result (program output) 42 to the user.

The execution phase is optional and the user could instead choose to store the atlas 38 as a result. This is useful when the same application is run multiple times and the user would like to avoid invoking the mapping system and incurring its computation overhead every time the application executes. Additionally, the code could be simulated instead of executed by executor/simulator 40. In this case, pMapper produces a timing value for the given program on the specified architecture.

The next section discusses the details of the mapping algorithm used in the current implementation. The technology is not limited to this particular algorithm, since the mapping framework is both modular and general. The mapping algorithm used in the current implementation is loosely based on dynamic programming. A dynamic programming algorithm works by building a table that stores intermediate results and incrementally builds up a solution to the problem. The mapping algorithm described here takes the approach of building a table, however many heuristics are built into the algorithm to reduce the complexity of the search space.

The table is built with SFG nodes along rows and the number of processors along columns. The algorithm iterates over the nodes in a specific order, depending on the structure of the signal flow graph. Specifically, an entry in row i, column j of the table is the atlas found for the first i nodes of the SFG on the first j processors of the parallel computer. Each entry in the table contains two pieces of information: the best atlas found up to this point and the execution time of that atlas.

Once the table is completely filled out, the last row contains the best atlas for each number of processors. The details on how each cell is filled are dependent on the current node being mapped. In one embodiment, pMapper supports constructors, subscripted assignments, subscripted references, FFTs, matrix multiplies, and a large number of element-wise operations. Note that the pMapper framework presented is a general framework that can be extended to map programs that contain operations other than FFTs, matrix multiplies, and redistribution (or subscripted assignment).

The details of the mapping are dependent on the type of node encountered in the SFG. The following paragraphs describe how the mapping is done for simple chain signal flow graphs. If the SFG is a tree, the nodes simply need to be sorted in topological order and then the same mapping algorithm can be applied.

During mapping, if node i is a constructor, pMapper simply delays the mapping of the node until more information becomes available. If this is the first node in the signal flow graph, then an empty atlas with execution time equal to 0 is produced. Otherwise, the information from the previous row of the same column of the table is copied.

If the node encountered is a subscripted assignment node, then there are two cases to consider. If the node is not the last node in the SFG, then the information from the same column, i−1 row is simply copied over. If the node is the last node, then the map for the right-hand side of the assignment has already been found. In this case, the same map is used for the left-hand side and the copy time is added to the overall execution time.

Now, an example involving the mapping of an FFT node will be described. Assuming this node is node i and is being mapped onto j processors, pMapper considers three cases:

In the first case, the input node is a constructor. In this case, the algorithm has complete mapping freedom, since no constraints have been imposed on the mapping. The algorithm thus chooses the best map for this node on j processors by querying the timing database. The algorithm stores the best map in the atlas and updates the total execution time.

In the second case, the input node is a subscripted assignment operation. In this case, the algorithm also has the freedom to map the operation; however, now both the FFT execution time and the assignment execution time have to be considered. The algorithm searches for the map that will minimize the time of both the FFT and the assignment.

In the third case, the input node is another function. In this case the input map has already been determined and the row of the table corresponding to the input node is searched and the map that has the minimum overall effect on the computation is used.

The same approach is used for mapping other functions, with a potentially different number of cases being considered, depending on the number of inputs into the function.

Figure 6:
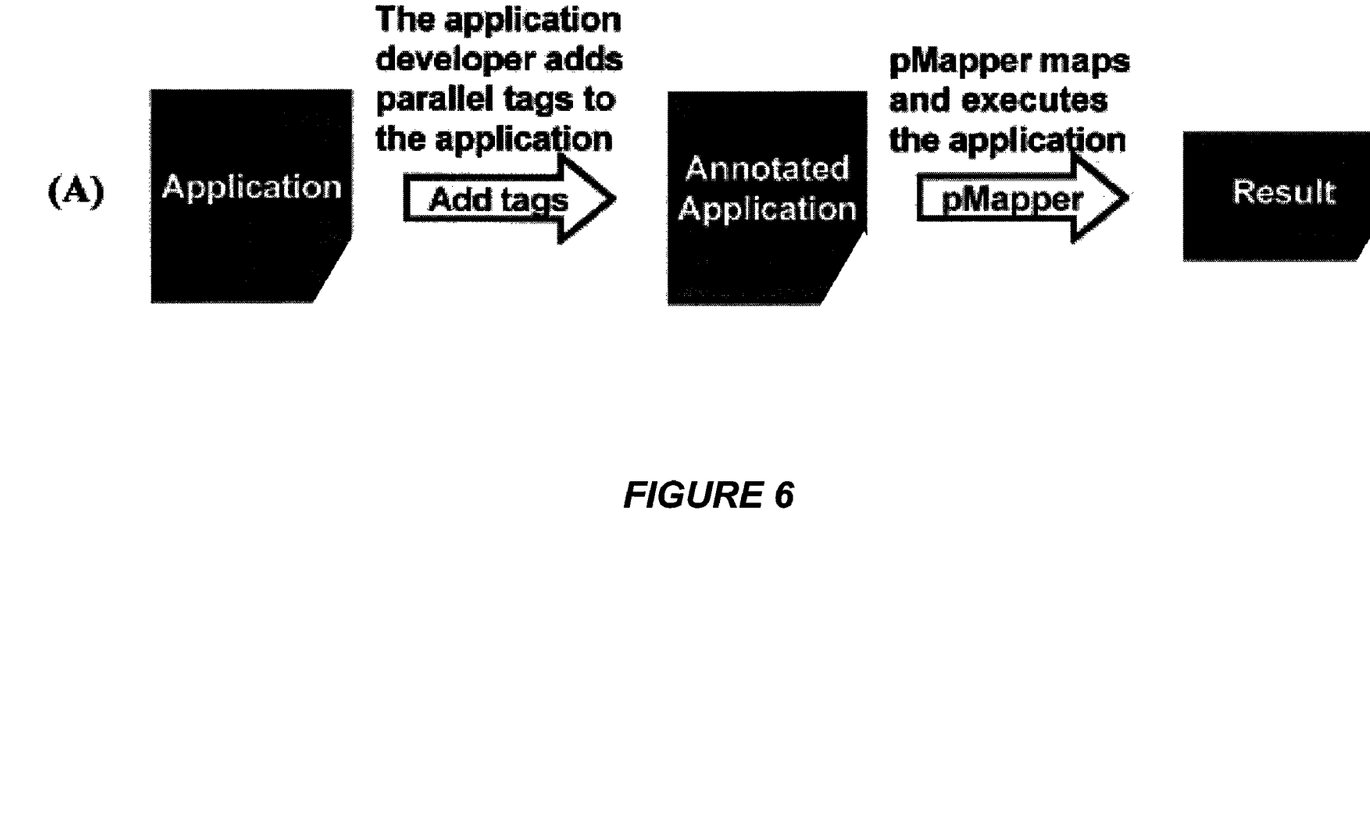
FIG. 6 depicts a block diagram of how pMapper is used in a first development process.

FIG. 6 illustrates how pMapper is used in a first development process. In one embodiment pMapper is particularly well suited for mapping scientific computing applications to multi-processor systems. In this capacity, pMapper is used to produce mappings at runtime for applications written in a high-level interpreted language, such as MATLAB. The applications would likely be mapped to cluster systems. In the mapping and execution phase, pMapper is used with the Executor. pMapper determines the maps, combines the maps with the program, and then executes the program. Additionally, the maps could be saved for later use if the application programmer so desires.

Figure 7:
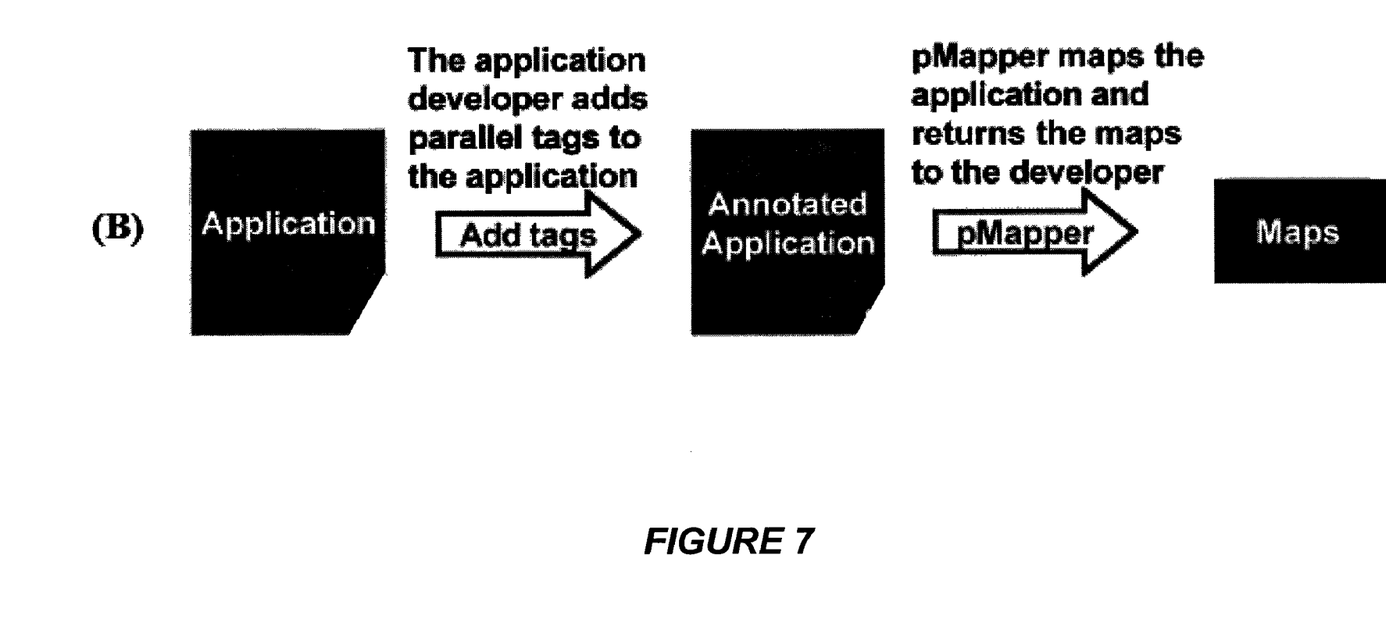
FIG. 7 depicts a block diagram of how pMapper is used in another development process.

FIG. 7 illustrates how pMapper is used in another development process. pMapper is easily extendable to be used to map real-time signal processing applications to embedded systems. While in some case the runtime mapping approach could be used in real-time computing, in most cases pMapper is used to first generate the mappings and then use those mappings in repeated runs of the application. Additionally, pMapper is valuable in these applications in the cases where no map was determined in advance for a certain conditional branch of the application. Currently, this situation could cause the application to either use a very inefficient map or potentially crash. On the other hand, pMapper prevents either from happening while incurring only a minor overhead for the mapping at runtime.

Figure 8:
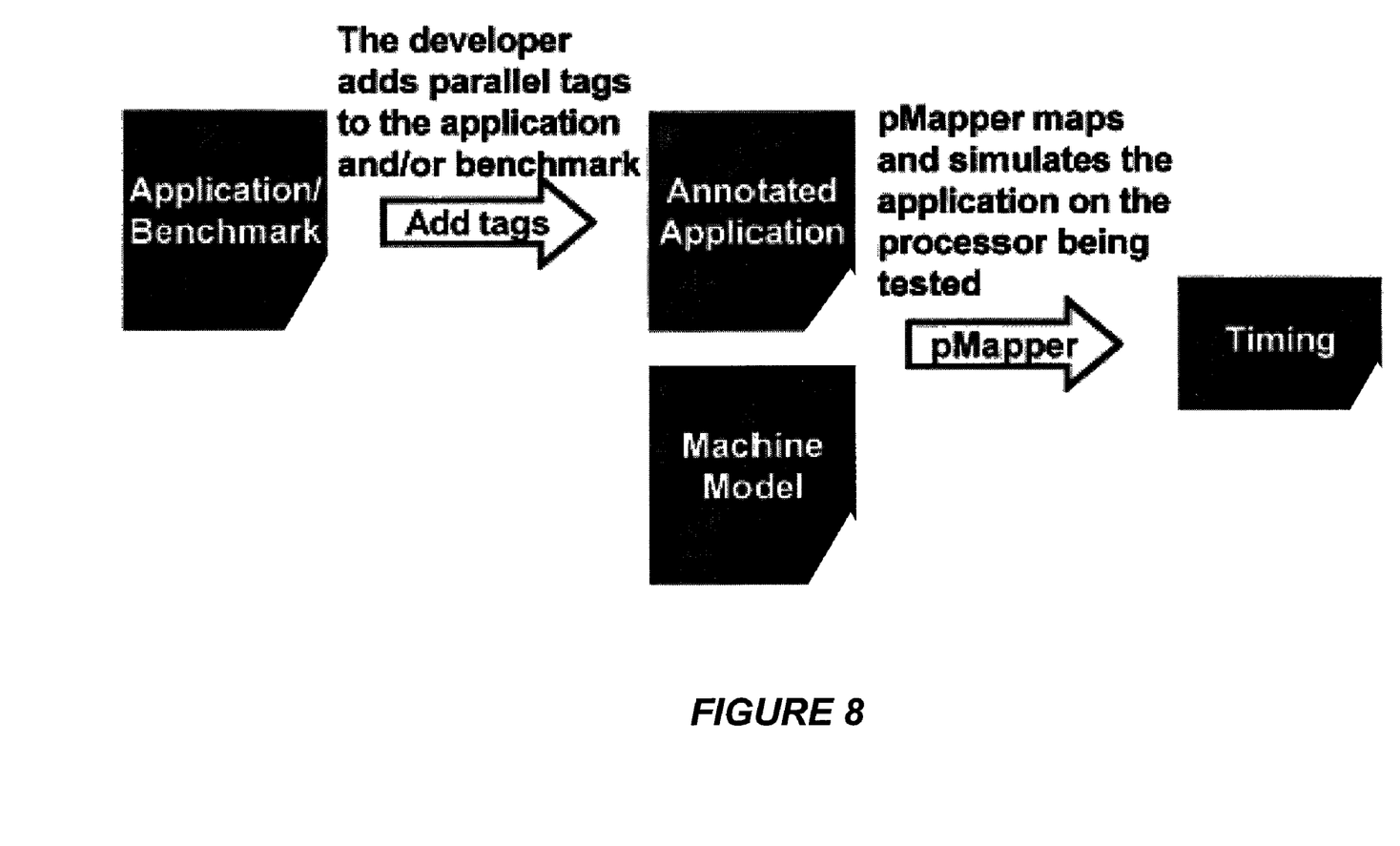
FIG. 8 depicts a block diagram of how pMapper is used in processor testing.

FIG. 8 illustrates how pMapper is used in processor testing. pMapper is a useful tool in determining how well a particular multi-processor would perform on either a set of benchmarks or on applications. In this capacity, pMapper is used with the simulator during the mapping and execution phase and produces timing data for the desired benchmarks and/or applications. This capability allows decisions to be made regarding whether a certain processor would meet the needs of specific programs and aid in purchasing decisions.

Figure 9:
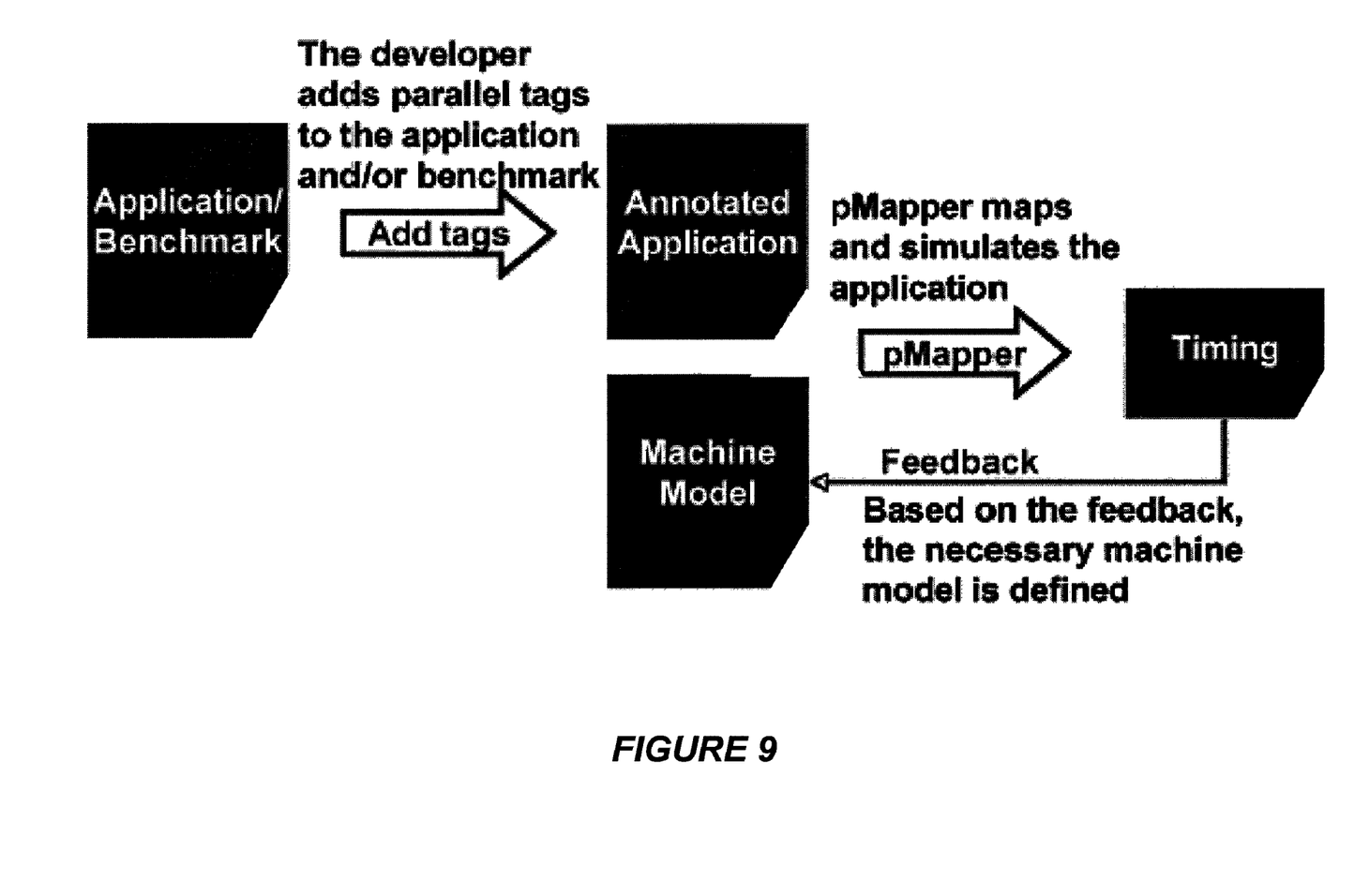
FIG. 9 depicts a block diagram of how pMapper is used in processor definition.

FIG. 9 illustrates how pMapper would be used in processor definition. pMapper is also a beneficial tool for determining processor specifications for particular programs and projects. It is used in the similar capacity as described above, except instead of testing a particular architecture, it would be used to determine what type of system should be purchased. Specifically, pMapper could help in decisions regarding how many processing elements should a system have and what type of latency requirements are necessary to satisfy the project's needs.

Figure 10A:
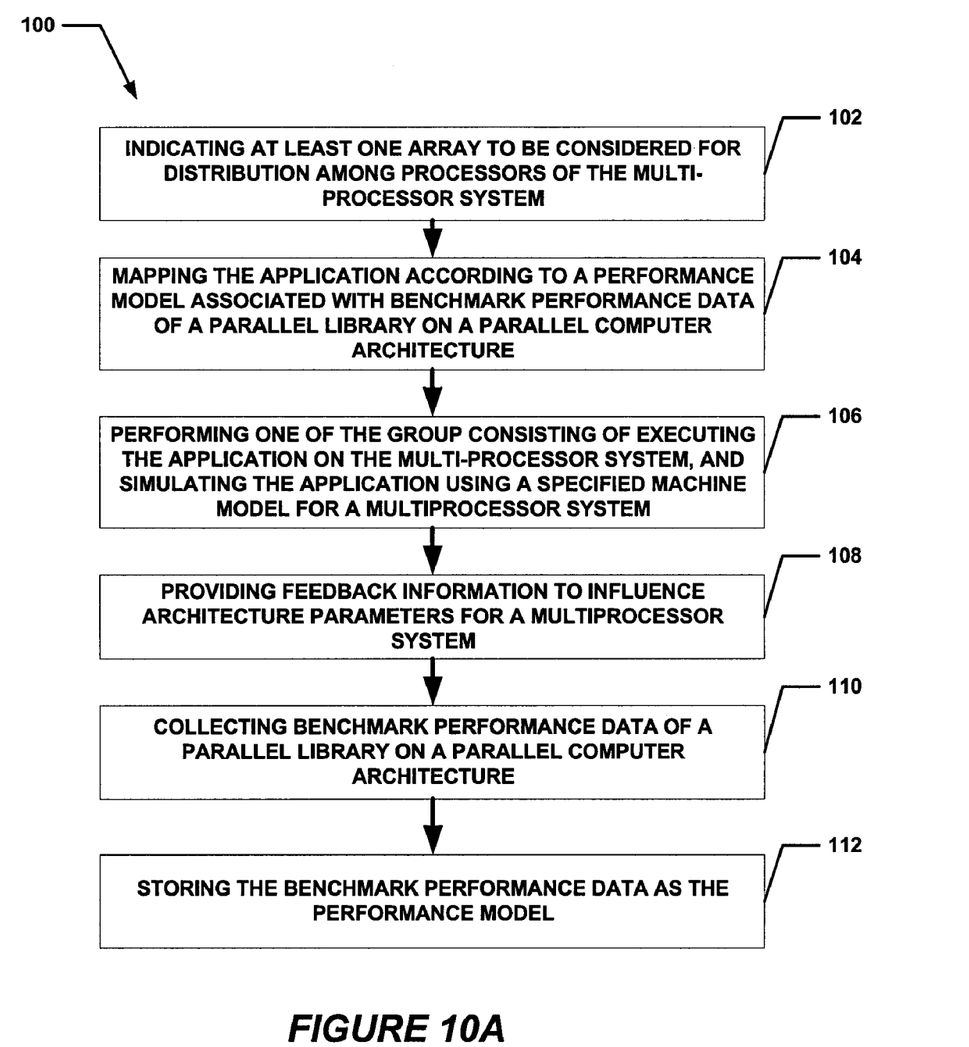
FIGS. 10A and 10B depict a flow diagram of a particular method for performing automatic mapping for a multi-processor system in accordance with embodiment of the invention.
Figure 10B:
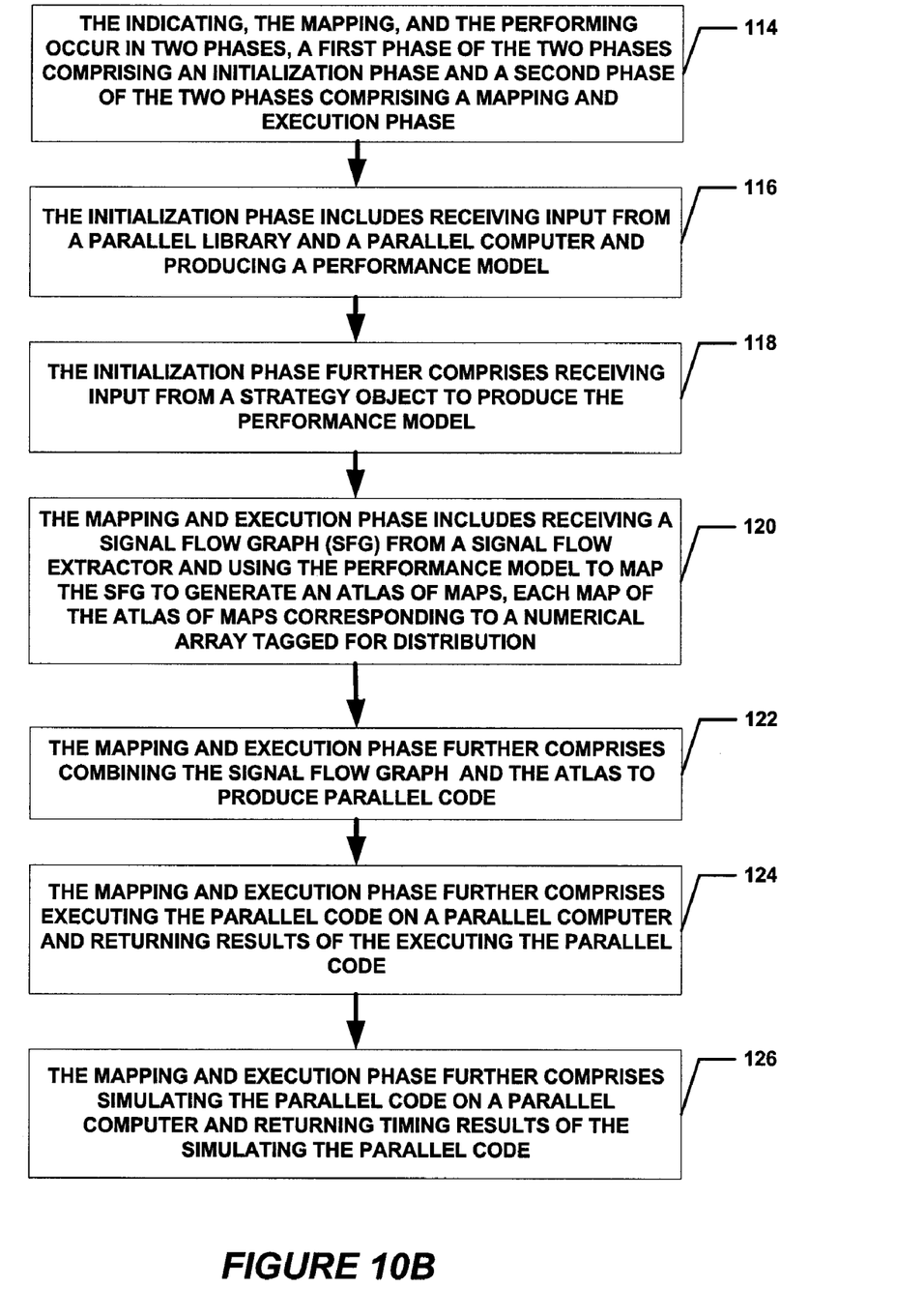

A flow chart of a particular embodiment of the presently disclosed method of mapping and executing an application on a multi-processor system is depicted in FIG. 10. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 10a and 10b, a particular embodiment of a method 100 for mapping and executing an application on a multi-processor system is shown. Method 100 begins with processing block 102 which discloses indicating at least one array to be considered for distribution among processors of the multi-processor system.

Processing block 104 states mapping the application according to a performance model associated with benchmark performance data of a parallel library on a parallel computer architecture. Processing block 106 recites performing one of the group consisting of executing the application on the multi-processor system, and simulating the application using a specified machine model for a multiprocessor system.

Processing block 108 discloses providing feedback information to influence architecture parameters for a multiprocessor system. Processing block 110 states collecting benchmark performance data of a parallel library on a parallel computer architecture. Processing block 112 recites storing the benchmark performance data as the performance model.

Processing continues with processing block 114 which discloses wherein the indicating, the mapping, and the performing occur in two phases, a first phase of the two phases comprising an initialization phase and a second phase of the two phases comprising a mapping and execution phase. Processing block 116 states the initialization phase includes receiving input from a parallel library and a parallel computer and producing a performance model.

Processing block 118 recites receiving input from a strategy object to produce the performance model. Processing block 120 discloses the mapping and execution phase includes receiving a signal flow graph (SFG) from a signal flow extractor and using the performance model to map the SFG to generate an atlas of maps, each map of the atlas of maps corresponding to a numerical array tagged for distribution.

Processing block 122 states wherein the mapping and execution phase further includes combining the signal flow graph and the atlas to produce parallel code. Processing block 124 recites wherein the mapping and execution phase further comprises executing the parallel code on a parallel computer and returning results of the executing the parallel code. Processing block 126 states the mapping and execution phase further comprises simulating the parallel code on a parallel computer and returning timing results of the simulating of the parallel code.

Figure 11:
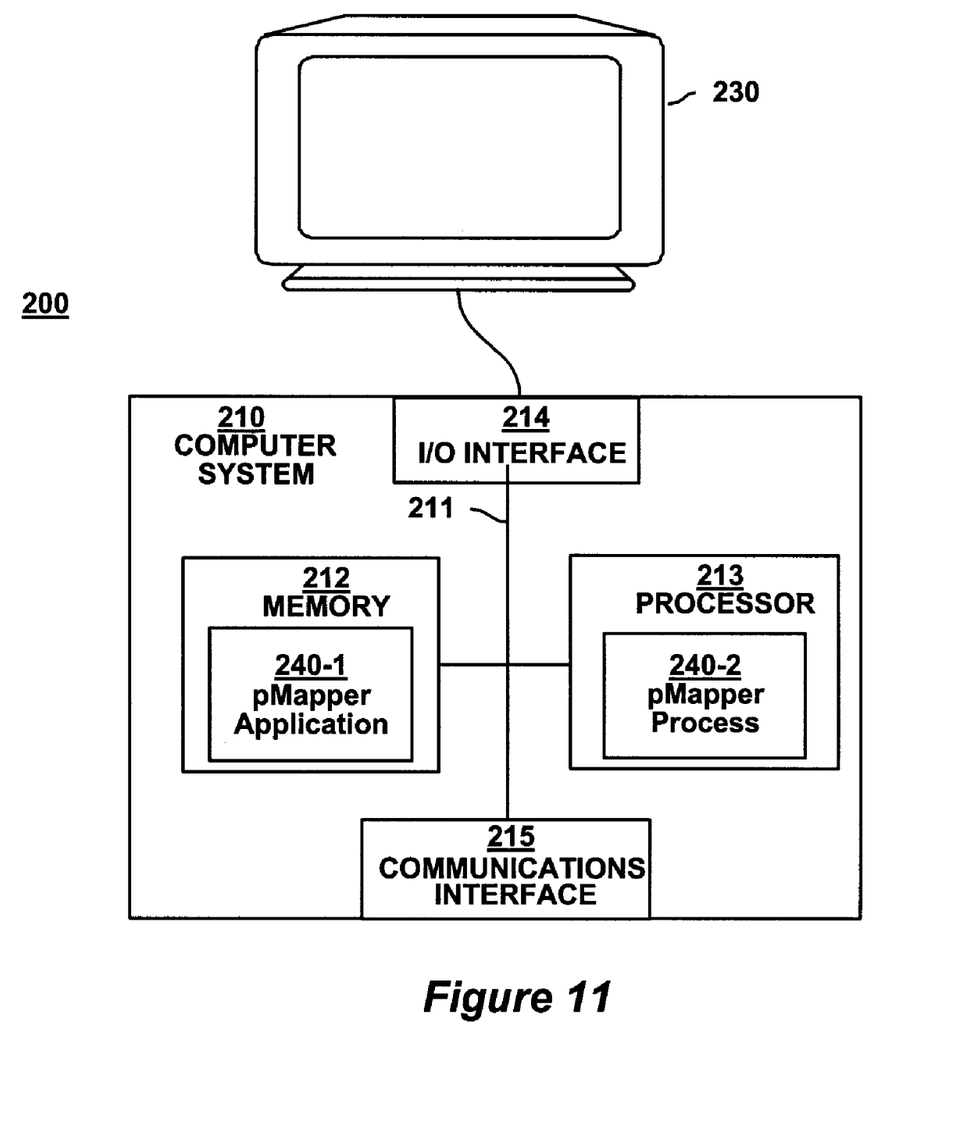
FIG. 11 illustrates an example computer system architecture for a computer system that performs automatic mapping for a multi-processor system in accordance with embodiments of the invention.

FIG. 11 is a block diagram illustrating an example computer system 200 for implementing pMapper function 240 and/or other related processes to carry out the different functionality as described herein.

As shown, computer system 200 of the present example includes an interconnect 211 that couples a memory system 212 and a processor 213 an input/output interface 214, and a communications interface 215.

As shown, memory system 212 is encoded with pMapper application 240-1. pMapper application 240-1 can be embodied as software code such as data and/or logic instructions (e.g., code stored in the memory or on another computer readable medium such as a disk) that support functionality according to different embodiments described herein.

During operation, processor 213 of computer system 200 accesses memory system 212 via the interconnect 211 in order to launch, run, execute, interpret or otherwise perform the logic instructions of the pMapper application 240-1. Execution of pMapper application 240-1 produces processing functionality in pMapper process 240-2. In other words, the pMapper process 240-2 represents one or more portions of the pMapper application 240-1 (or the entire application) performing within or upon the processor 213 in the computer system 200.

It should be noted that, in addition to the pMapper process 240-2, embodiments herein include the pMapper application 240-1 itself (i.e., the un-executed or non-performing logic instructions and/or data). The pMapper application 240-1 can be stored on a computer readable medium such as a hard disk or optical medium. The pMapper application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of pMapper application 240-1 in processor 213 as the pMapper process 240-2. Those skilled in the art will understand that the computer system 200 can include other processes and/or software and hardware components, such as an operating system that controls allocation and use of hardware resources associated with the computer system 200.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of mapping and executing an application on a multi-processor system, the method comprising:
   indicating at least one array to be considered for distribution among processors of said multi-processor system;
   mapping said application according to a performance model associated with benchmark performance data of a parallel library on a parallel computer architecture;
   performing one of the group consisting of executing said application on said multi-processor system, and simulating said application using a specified machine model for a multiprocessor system; and
   providing feedback information to influence architecture parameters for a multiprocessor system, wherein said indicating, said mapping, and said performing occur in two phases, a first phase of said two phases comprising an initialization phase and a second phase of said two phases comprising a mapping and execution phase, and wherein said mapping and execution phase includes receiving a signal flow graph (SFG) from a signal flow extractor and using the performance model to map the SFG to generate an atlas of maps, each map of the generate an atlas of maps corresponding to a numerical array tagged for distribution.

2. The method of claim 1 further comprising collecting benchmark performance data of a parallel library on a parallel computer architecture.

3. The method of claim 2 further comprising storing said benchmark performance data as said performance model.

4. The method of claim 1 wherein said initialization phase includes receiving input from a parallel library and a parallel computer and producing a performance model.

5. The method of claim 4 wherein said initialization phase further comprises receiving input from a strategy object to produce said performance model.

6. The method of claim 1 wherein said mapping and execution phase further comprises combining said signal flow graph and said atlas to produce parallel code.

7. The method of claim 6 wherein said mapping and execution phase further comprises executing said parallel code on a parallel computer and returning results of said executing said parallel code.

8. The method of claim 6 wherein said mapping and execution phase further comprises simulating said parallel code on a parallel computer and returning timing results of said simulating said parallel code.

9. The method of claim 1 wherein said SFG is extracted from an entire program signal flow graph by tracing back from a last write to a variable requiring evaluation and including nodes through node dependencies.

10. A computer readable medium having computer readable code thereon for mapping and executing an application on a multi-processor system, the medium comprising:
   instructions for indicating at least one array to be considered for distribution among processors of said multi-processor system;
   instructions for mapping said application according to a performance model associated with benchmark performance data of a parallel library on a parallel computer architecture;
   instructions for performing one of the group consisting of executing said application on said multi-processor system, and simulating said application using a specified machine model for a multiprocessor system; and
   instructions for providing feedback information to influence architecture parameters for a multiprocessor system, wherein said indicating, said mapping, and said performing occur in two phases, a first phase of said two phases comprising an initialization phase and a second phase of said two phases comprising a mapping and execution phase, and wherein said mapping and execution phase includes receiving a signal flow graph (SFG) from a signal flow extractor and using the performance model to map the SFG to generate an atlas of maps, each map of the generate an atlas of maps corresponding to a numerical array tagged for distribution.

11. The computer readable medium of claim 10 further comprising instructions for collecting benchmark performance data of a parallel library on a parallel computer architecture.

12. The computer readable medium of claim 11 further comprising instructions for storing said benchmark performance data as said performance model.

13. The computer readable medium of claim 10 wherein said initialization phase includes instructions for receiving input from a parallel library and a parallel computer and producing a performance model.

14. The computer readable medium of claim 13 further comprising receiving input from a strategy object to produce said performance model.

15. The computer readable medium of claim 10 wherein said mapping and execution phase further includes instructions for combining said signal flow graph and said atlas to produce parallel code.

16. The computer readable medium of claim 15 wherein said mapping and execution phase further comprises instructions for executing said parallel code on a parallel computer and returning results of said executing said parallel code.

17. The computer readable medium of claim 15 wherein said mapping and execution phase further comprises instructions for simulating said parallel code on a parallel computer and returning timing results of said simulating said parallel code.

18. The computer readable medium of claim 10 wherein said SFG is extracted from an entire program signal flow graph by tracing back from a last write to a variable requiring evaluation and including nodes through node dependencies.

19. A computer system comprising:
a memory;
a processor;
a communications interface;
an interconnection mechanism coupling the memory, the processor and the communications interface; and
wherein the memory is encoded with an application that when performed on the processor, provides a process for processing information, the process causing the computer system to perform the operations of:
indicating at least one array to be considered for distribution among processors of said multi-processor system;
mapping said application according to a performance model associated with benchmark performance data of a parallel library on a parallel computer architecture;
performing one of the group consisting of executing said application on said multi-processor system, and simulating said application using a specified machine model for a multiprocessor system; and
providing feedback information to influence architecture parameters for a multiprocessor system, wherein said indicating, said mapping, and said performing occur in two phases, a first phase of said two phases comprising an initialization phase and a second phase of said two phases comprising a mapping and execution phase, and wherein said mapping and execution phase includes receiving a signal flow graph (SFG) from a signal flow extractor and using the performance model to map the SFG to generate an atlas of maps, each map of the generate an atlas of maps corresponding to a numerical array tagged for distribution.

20. The computer system of claim 19 wherein said SFG is extracted from an entire program signal flow graph by tracing back from a last write to a variable requiring evaluation and including nodes through node dependencies.

* * * * *